United States Patent
Lisart et al.

(10) Patent No.: US 10,950,559 B2
(45) Date of Patent: Mar. 16, 2021

(54) PROTECTED ELECTRONIC INTEGRATED CIRCUIT CHIP

(71) Applicants: STMicroelectronics (Rousset) SAS, Rousset (FR); STMicroelectronics (Research & Development) Limited, Marlow (GB)

(72) Inventors: Mathieu Lisart, Aix en Provence (FR); Bruce Rae, Edinburgh (GB)

(73) Assignees: STMicroelectronics (Rousset) SAS, Rousset (FR); STMicroelectronics (Research & Development) Limited, Marlow (GB)

( * ) Notice: Subject to any disclaimer, the term of this patent is extended or adjusted under 35 U.S.C. 154(b) by 0 days.

(21) Appl. No.: 16/436,747

(22) Filed: Jun. 10, 2019

(65) Prior Publication Data

US 2019/0385957 A1    Dec. 19, 2019

(30) Foreign Application Priority Data

Jun. 14, 2018 (FR) ....................................... 1870700

(51) Int. Cl.
*H01L 23/58* (2006.01)
*H01L 23/00* (2006.01)

(52) U.S. Cl.
CPC ................... *H01L 23/576* (2013.01)

(58) Field of Classification Search
CPC ... H01L 23/552; H01L 23/562; H01L 23/576; H01L 31/12–173; G06F 21/75; G06F 21/86
See application file for complete search history.

(56) References Cited

U.S. PATENT DOCUMENTS

| | | | |
|---|---|---|---|
| 2009/0001821 A1* | 1/2009 | Walker | H01L 24/80 307/413 |
| 2017/0010232 A1* | 1/2017 | Daamen | G01N 27/223 |
| 2019/0148313 A1* | 5/2019 | Jullian | H01L 23/576 257/499 |

FOREIGN PATENT DOCUMENTS

| | | |
|---|---|---|
| WO | 2008102282 A2 | 8/2008 |
| WO | 2009016589 A2 | 2/2009 |

OTHER PUBLICATIONS

INPI Search Report and Written Opinion for FR 1870700 dated Dec. 6, 2018 (8 pages).

* cited by examiner

*Primary Examiner* — Zandra V Smith
*Assistant Examiner* — Molly K Reida
(74) *Attorney, Agent, or Firm* — Crowe & Dunlevy

(57) ABSTRACT

An electronic integrated circuit chip includes a semiconductor substrate with a front side and a back side. A first reflective shield is positioned adjacent the front side of the semiconductor substrate and a second reflective shield is positioned adjacent the back side of the semiconductor substrate. Photons are emitted by a photon source to pass through the semiconductor substrate and bounce off the first and second reflective shields to reach a photon detector at the front side of the semiconductor substrate. The detected photons are processed in order to determine whether to issue an alert indicating the existence of an attack on the electronic integrated circuit chip.

15 Claims, 4 Drawing Sheets

PROTECTED ELECTRONIC INTEGRATED CIRCUIT CHIP

PRIORITY CLAIM

This application claims the priority benefit of French patent application number 1870700, filed on Jun. 14, 2018, the content of which is hereby incorporated by reference in its entirety to the maximum extent allowable by law.

TECHNICAL FIELD

The present disclosure generally concerns electronic integrated circuit chips, and in particular the protection of an integrated circuit chip against attacks.

BACKGROUND

Integrated circuit chips containing information, the access to which is reserved to authorized persons, such as bank card integrated circuit chips, are likely to be targeted by attacks.

Various types of attacks may be conducted from the back side of an integrated circuit chip, i.e., from the side of the semiconductor substrate of the integrated circuit chip opposite to the side of the substrate where electronic circuits containing the information are located. In a type of attack, the attacker etches a portion of the back side of the semiconductor substrate to reach elements of the circuits such as, for example, transistors or diodes. To achieve this, the attacker may use a focused ion beam FIB. The attacker can thus access these elements, through which information is withdrawn. In other types of back side attacks, the attacker disturbs the circuit operation by means of a laser or by application against the back side of a probe taken to a high voltage. The attacker then deduces the coveted information from the effect of such disturbances, currently called "faults". The attacker can also use various techniques of observation of the integrated circuit chip operation from the back side, for example, by mapping various types of electromagnetic or photon emissions generated by the operating integrated circuit chip circuits.

SUMMARY

An embodiment overcomes all or part of the disadvantages of known electronic integrated circuit chips.

An embodiment overcomes all or part of the disadvantages of known devices of protection against attacks.

Thus, an embodiment provides an electronic integrated circuit chip comprising first and second stacked shields and a first photon detector located between the first and second shields.

According to an embodiment, the first shield and/or the second shield is metallic.

According to an embodiment, the integrated circuit chip comprises a semiconductor substrate having a back side covered by the second shield, and a front side having the first photon detector located inside and on top of it.

According to an embodiment, the first and/or the second shield has a full surface in a position vertically above the first photon detector, preferably extending horizontally in all directions from said position along at least a first distance greater than a second distance separating the considered shield from the front side of the substrate.

According to an embodiment, the second shield leaves the back side of a portion of the substrate exposed.

According to an embodiment, the integrated circuit chip comprises a second photon detector located inside and on top of said portion.

According to an embodiment, the integrated circuit chip comprises a photon source, preferably comprising a ring oscillator, arranged to emit photons towards a surface of the second shield facing the first detector.

According to an embodiment, the first detector comprises a SPAD diode.

An embodiment provides a method of protecting an integrated circuit chip such as hereabove.

According to an embodiment, the method comprises a step of measuring a value representative of a number of photons detected by the first photon detector during a time period.

According to an embodiment, the method comprises a step of detecting a difference between the measured value and an expected value.

According to an embodiment, the method comprises a step of comparing the measured value with a threshold.

According to an embodiment, the threshold is a value representative of a number of photons detected by the second photon detector during said time period.

According to an embodiment, the method comprises a step of selection of one or a plurality of photon sources.

According to an embodiment, the selection step comprises the random selection of a group of photon sources from among a plurality of predefined groups, the selected photon sources being those of the selected photon group.

According to an embodiment, the method comprises a step of photon emission towards the second shield by the selected photon sources.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
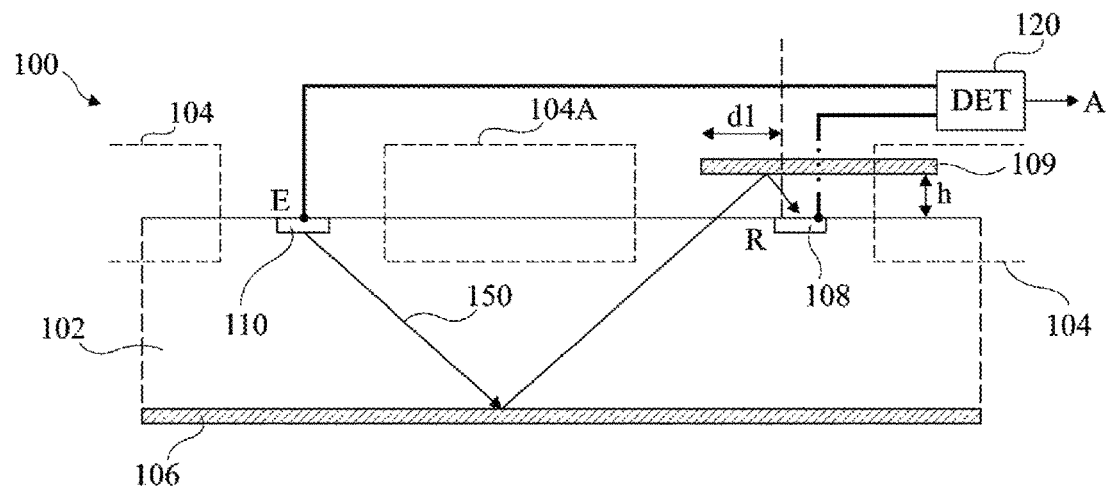
FIG. 1 is a partial simplified cross section view illustrating an embodiment of an electronic integrated circuit chip.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, circuits of a integrated circuit chip, including circuits of control and of recharge of a SPAD diode, are neither shown, nor described in detail, the described embodiments being compatible with most current integrated circuit chip circuits and current SPAD diode control and recharge circuits.

In the following description, when reference is made to terms qualifying absolute positions, such as terms "top", "bottom", "left", "right", etc., or relative positions, such as terms "above", "under", "upper", "lower", etc., or to terms qualifying directions, such as terms "horizontal", "vertical", etc., unless otherwise indicated, it is referred to the orientation of the drawings.

The terms "approximately", "substantially", and "in the order of" are used herein to designate a tolerance of plus or minus 10%, preferably of plus or minus 5%, of the value in question.

In the present description, unless otherwise specified, term "connected" designates a direct electric connection between two elements, for example, by conductive materials, while term "coupled" designates an electric connection between two elements which may be direct or via one or a plurality of passive or active components, such as resistors, capacitors, inductances, diodes, transistors, etc.

FIG. 1 is a partial simplified cross-section view illustrating an embodiment of an electronic integrated circuit chip 100. In this context, the electronic integrated circuit chip 100 comprises a semiconductor substrate and electronic circuit elements located in the substrate and/or on opposite surfaces of the substrate, wherein the opposite surfaces are a front face and a rear face of the substrate.

Preferably, integrated circuit chip 100 comprises a substrate 102 having circuits 104 formed inside and on top of it. Substrate 102 is, for example, a semiconductor wafer portion, for example, made of silicon. Circuits 104 are located on the front side of the substrate 102 of the integrated circuit chip 100. Each circuit 104 comprises a plurality of interconnected components, for example, transistors (not shown). As an example, among circuits 104, a circuit to be protected 104A contains elements to be protected against attacks. The integrated circuit chip may comprise a plurality of, or only some, circuits to be protected.

Integrated circuit chip 100 comprises a shield 106, preferably metallic. Shield 106 covers substrate 102 on the back side. Shield 106 is, for example, formed of an aluminum or copper layer. Preferably, shield 106 integrally covers the portion of the back side located under the elements to be protected of circuit 104A.

Shield 106 enables to prevent any back side attack which would leave shield 106 intact, for example, attacks aiming at disturbing the operation of the circuits by application of a laser or of a high potential on the back side, or aiming at analyzing emissions generated by the components of circuit 104A.

Integrated circuit chip 100 further comprises a photon detector 108, preferably located inside and on top of the front side of the substrate 102 for the integrated circuit chip 100. Detector 108 for example comprises a single photon detection avalanche diode or SPAD diode. Detector 108 is located under a shield 109. Shield 109 is preferably a portion of a metal layer, for example, made of aluminum or of copper. Shield 109 is preferably located in insulating layers covering the front side of substrate 102, for example, at a level of metal conductive tracks of interconnection (i.e., metallization layers) between the components of circuits 104 of the integrated circuit chip.

Preferably, shield 109 extends horizontally from a position vertically above detector 108, for example, along at least a distance d1. Distance d1 is preferably longer, for example, twice longer, than a distance h separating shield 109 from the front side of the substrate. Distance d1 is, for example, counted from a position vertically above an edge of a region of the detector sensitive to photons. As an example, distance d1 is longer than 5 μm, preferably longer than 10 μm. Preferably, shield 109 extends in all directions from the position vertically above the detector all the way to at least distance d1. Shield 109 thus has a full surface, comprising no opening, at least all the way to distance d1 from this position. It is thus avoided for photons reaching the integrated circuit chip on the front side to reach detector 108.

Preferably, integrated circuit chip 100 further comprises a photon source 110 (E) at the front side of the substrate 102, arranged to emit photons through the substrate and towards screen 106 when source 110 is activated. Source 110 and detector 108 may be coupled to a detection circuit 120 (DET). Although not explicitly shown, circuit 120 is, for example, a circuit formed inside and on top of substrate 102.

As an example, a test phase is provided, preferably during an integrated circuit chip starting phase. During the test phase, circuit 120 counts the photons detected by detector 108, for example, during a predefined time period T. To achieve this, circuit 120 may in particular comprise a circuit for controlling the SPAD diode enabling to recharge the SPAD diode after the detection of each photon. Circuit 120 deduces from the number of photons detected during time period T a measured value of the photon arrival frequency, for example, the ratio of the number of detected photons to time period T. As an example, circuit 120 calculates a difference between the measured value and an expected value. In case of a difference greater than a threshold, circuit 120 emits an alert or alarm signal A. Preferably, during the test, circuit 120 activates source 110, which then emits photons 150.

In the absence of an attack, photons are emitted by source 110, among which photons 150 are emitted towards shield 106. Photons 150 are reflected by shield 106. Some of photons 150, for example, after reflection on shield 109, reach detector 108. It is provided, for this purpose, for the wavelength of at least part of the photons emitted by source 110 to be preferably greater than 900 nm, for example, smaller than 1,000 nm. In the case of a silicon substrate, such a wavelength enables photons 150 to cross the silicon along a length sufficient to propagate all the way to detector 108. To achieve this, it is for example provided for the substrate doping level to be low, typically smaller than approximately $10^{17}$ atoms/cm$^3$. The distance separating source 110 from detector 108 is preferably identical to 200 μm, for example, smaller than 100 μm.

Figure 2:
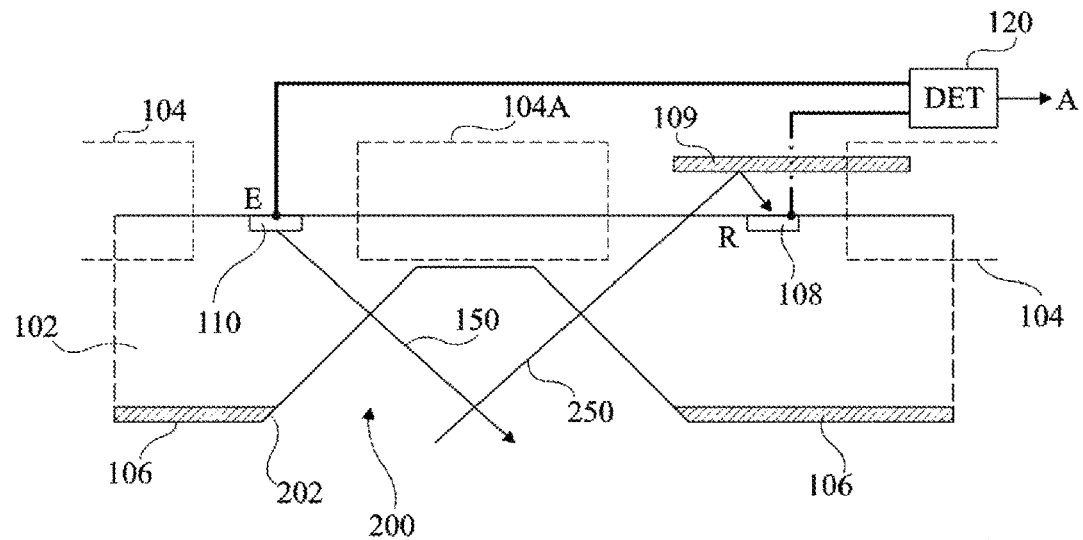
FIG. 2 is a partial simplified cross section view of the integrated circuit chip of FIG. 1 during an attack attempt.

FIG. 2 is a partial simplified cross-section view of the integrated circuit chip of FIG. 1 during an example of an attack attempt.

A cavity 200 is dug from the back side towards circuit 104A by an attacker. The attacker desires to analyze the operation of circuit 104A located above the bottom of cavity 200, and to deduce therefrom the coveted information. The lateral dimensions of cavity 200 are typically greater than 100 μm, for example, in the range from 100 μm to 200 μm.

Cavity 200 corresponds to an opening 202 in shield 106. Part of photons 150 come out through opening 202 and is no longer reflected by shield 109 and detector 108. Detector 108 receives a small number of photons 150. Circuit 120 then emits the alarm signal A. Signal A may be processed by the integrated circuit chip to take any countermeasure usual to stop the attack, which enables to protect the information.

Integrated circuit chip 100 thus obtained is protected against any back side attack, including attacks during which shield 106 is partially or totally removed.

As a variation, source 110 is not activated during the test phase. The expected value of the photon arrival frequency then is for example zero, and circuit 120 generates the alarm signal A for example when the measured value is greater than a threshold. In the absence of an attack, shield 106 avoids for external photons arriving under the back side of the integrated circuit chip to reach detector 108, directly or after having been reflected by shield 109. Shield 106 may be metallic or non-metallic. In case of an attack attempt, detector 108 receives photons 250, for example, originating from a laser (not shown) used to conduct an attack or originating from ambient light. Circuit 120 then detects the attack attempt.

The integrated circuit chip may implement a plurality of test phases such as described hereabove, where source 110 is active or inactive.

Shield 106 for example entirely covers the back side of the substrate. Shield 106 then enables, when it is intact, to prevent for various parasitic photons, for example, originating from ambient light, to reach detector 108. A photon arrival frequency smaller than 500 Hz in the presence of shield 106 can be obtained when source 110 is inactive. Such photons originate from the noise surrounding the detector. When source 110 is active, the frequency value may exceed 10 MHz, preferably 100 MHz. By comparison, when shield 106 is absent, the measured frequency is typically in the range from 10 kHz to 100 kHz, for example, 20 kHz, due to the integrated circuit chip environment. The attack is thus all the more reliably detected as the difference is large between the frequency values measured in the absence and in the presence of an attack attempt.

Figure 3:
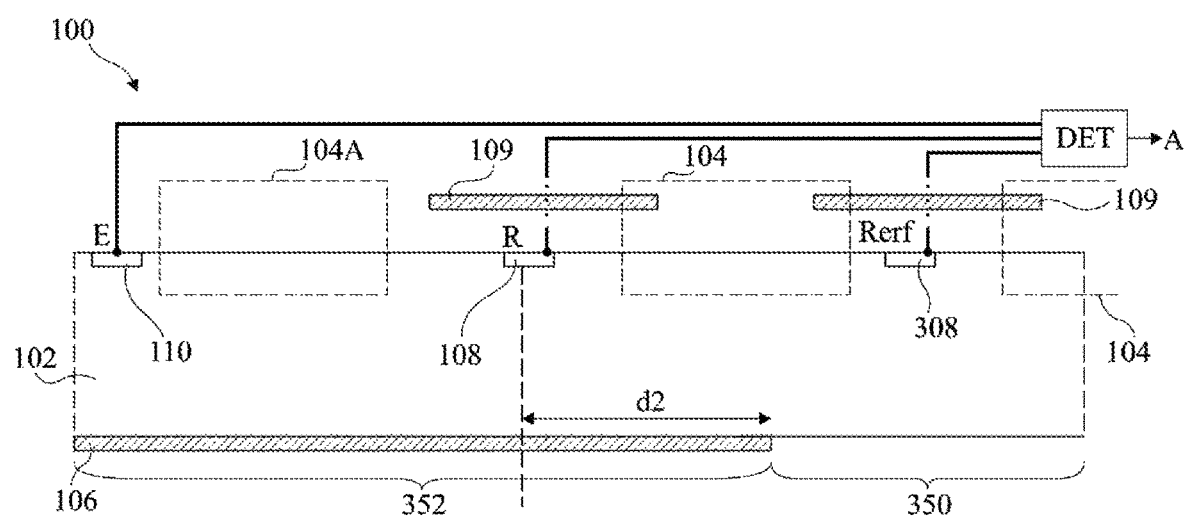
FIG. 3 is a partial simplified cross section view of an alternative embodiment of the integrated circuit chip of FIG. 1.
Figure 4:
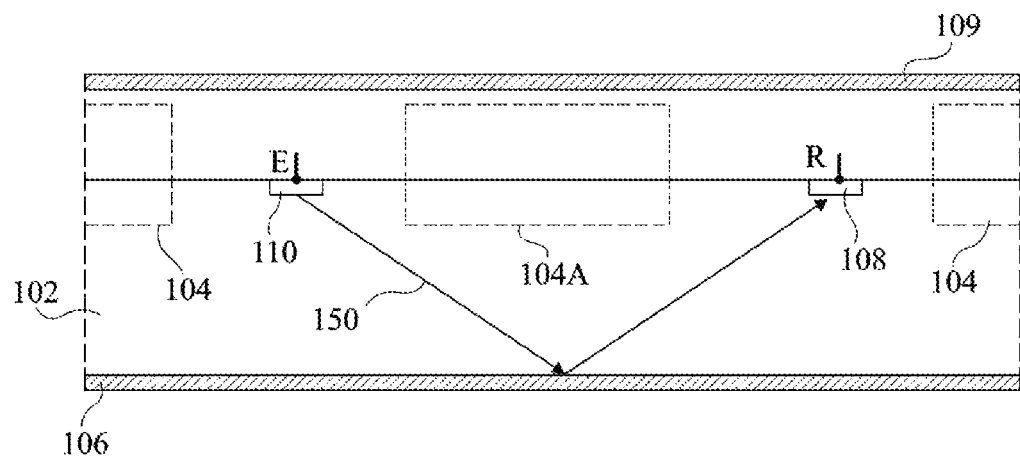
FIG. 4 is a partial simplified cross section view of another alternative embodiment of the integrated circuit chip of FIG. 1.
Figure 5:
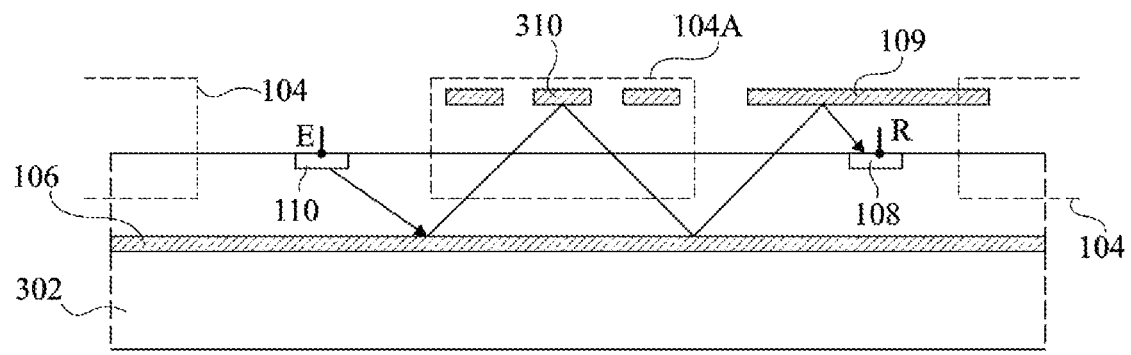
FIG. 5 is a partial simplified cross section view of still another alternative embodiment of the integrated circuit chip of FIG. 1.

FIGS. 3, 4, and 5 are partial simplified cross section views of alternative embodiments of the integrated circuit chip of FIG. 1.

In the variation of FIG. 3, integrated circuit chip 100 comprises a portion 350 of substrate 102 left exposed by shield 106. Preferably, shield 106 however covers at least then entire back side of a portion 352 of substrate 102. Portion 352 extends horizontally from the position vertical above the detector, preferably along a distance d2 greater than the substrate thickness, that is, the distance separating shield 106 from the front side of the substrate. Distance d2 is for example greater than 2 times the substrate thickness. Preferably, this substrate portion extends horizontally at least along distance d2 in all directions from the position vertically above detector 108. An attack detection reliability such as that obtained for a shield 106 totally covering the back side of the substrate, such as shown in FIG. 1, is then kept.

Preferably, a photon detector 308 (Rref) is located inside and on top of portion 350 of the substrate 102. Portion 350 comprising no shield 106 extends horizontally from the position above detector 308, preferably all around the position above detector 308, along a distance for example greater than the thickness of substrate 350.

Circuit 120 may be provided to detect a small difference between values of the frequency of photon arrival on detectors 108 and 308. Alert signal A is then emitted when the difference is smaller than a threshold. If, during an attack, a portion of shield 106 extending from the position above detector 108 is removed, the value of the frequency of photon arrival on detector 108 comes close to the value of the frequency of photon arrival on detector 308 and the attack attempt is detected and countered.

In the variation of FIG. 4, shield 109 covers the entire front side of the integrated circuit chip. Shield 109 is for example an upper portion of a package having the integrated circuit chip located therein. Shield 109 is for example an opaque polymer layer. In this case, detector 108 is configured to detect photons reaching detector 108 on the side of shield 106. In operation, photons 150 emitted by source 110 towards shield 106 reach detector 108 after reflection by shield 106. As a variation, shield 109 is a metal layer.

According to an advantage, it is then possible to detect and counter an attack comprising the removal of all or part of shield 109.

In the variation of FIG. 5, the integrated circuit chip comprises a support 302 located under shield 106. Support 302 is preferably a polymer material, for example, a resin, or is metallic. Support 302 enables to provide for the use of a thin substrate 102, for example, having a thickness smaller than that of support 302 or for example smaller than 80 µm, preferably equal to approximately 70 µm, more preferably still equal to approximately 30 µm, while keeping mechanical properties of integrated circuit chip 100 sufficient for integrated circuit chip 100 to be able to be easily handled by current means. As an example, the total thickness between the back side of support 302 and the front side of substrate 102 is in the range from 100 µm to 200 µm, for example, approximately 140 µm.

During a test phase where source 110 is active, photons 150 are reflected a plurality of times, successively by shield 106 and by circuit 104A to be protected. Circuit 104A reflects the photons for example due to the presence in circuit 104A of interconnection tracks 310. Tracks 310 interconnect the components of circuit 104A and are located between layers of insulator (not shown). Circuit 104A may also reflect the photons due to refraction index variations, for example, between the substrate and layers of insulator. The provision of a thin substrate 102 enables to limit the distance between shield 106 and the components to be protected. This enables to limit the distance traveled by the photons reflected a plurality of times, and thus to limit the number of photons which are absorbed before reaching detector 108. The reliability of the detection of an attack is thus increased with respect to a integrated circuit chip having a non-thin substrate.

As an example, to manufacture the integrated circuit chip of FIG. 5, circuits 104 are formed inside and on top of a substrate which is desired to be thinned by polishing down to the desired thickness. The front side is temporarily covered with a support plate, for example, made of glass, intended to be used as a handle during the polishing. The back side is then polished to thin down the substrate. After the polishing, shield 106 is formed by metallization of the back side, after which support 302 is formed.

Figure 6:
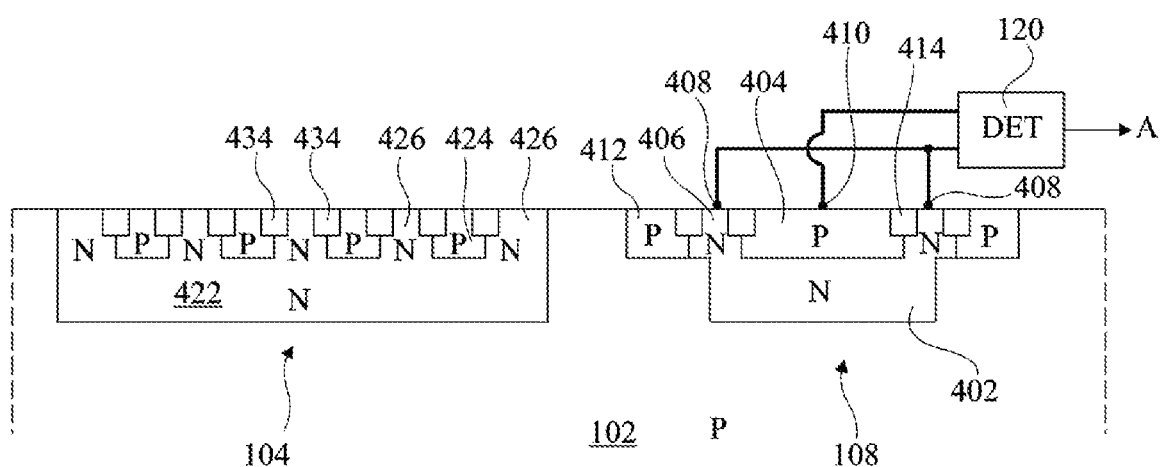
FIG. 6 schematically illustrates an embodiment of a circuit to be protected and of a photon detector of the integrated circuit chip of FIG. 1.

FIG. 6 schematically illustrates an embodiment of a circuit 104 and of photon detector 108 of integrated circuit chip 100 of FIG. 1, located inside and on top of substrate 102, for example, P-type doped.

Detector 108 comprises an N-type doped buried well 402 located under a P-type doped well 404. Wells 402 and 404 respectively define the cathode and the anode of a SPAD diode. The periphery of N well 402 is topped with an N-type doped ring-shaped well 406. N well 406 surrounds P well 404 and is in contact with N well 402. N well 406 is topped with contacts 408 which couple N well 406 to circuit 120. P well 404 is topped with a contact 410 which coupled P well 404 to circuit 120. A P-type doped well 412 may be formed around N well 406. Insulation trenches 414, filled with an insulator, extend from the front side of the substrate (upper surface) between wells 404, 406, and the possible well 412.

Circuit 104 comprises an N-type doped buried well 422, located under and in contact with wells 424 and 426 having respective alternated P and N types. Insulation trenches 434 extend from the upper surface of substrate 102 between neighboring P and N wells 424 and 426. Components of circuit 104, not shown, are formed inside and on top of P and N wells 424 and 426.

An advantage is that wells 402 and 422 can be formed at the same time, wells 404, 412, and 424 can be formed at the same time, wells 406 and 426 can be formed at the same time, and insulating trenches 414 and 434 can be formed at the same time. Thus, the structure of the SPAD diode can be obtained with no additional step with respect to the manufacturing of the integrated circuit chip circuits. The wells simultaneously formed preferably reach substantially the same depth in the substrate, for example, the same depth.

The N and P conductivity types of the embodiment of FIG. 6 may be exchanged. In a variation, N well 422 is omitted.

Figure 7:
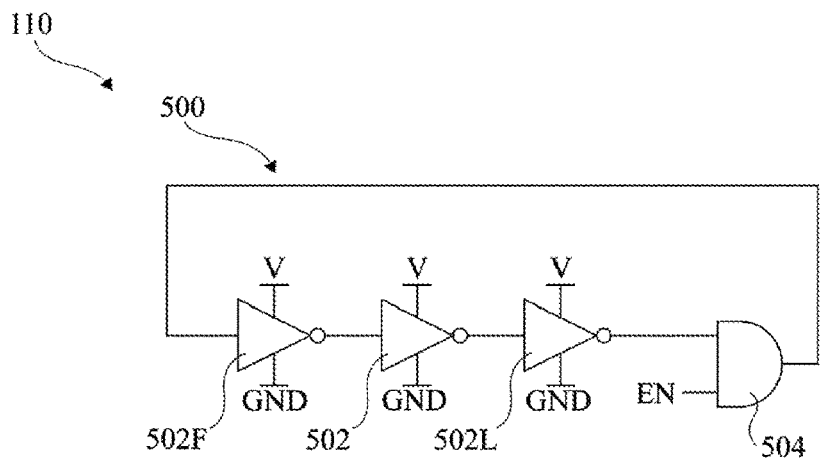
FIG. 7 schematically illustrates an embodiment of a photon source of the integrated circuit chip of FIG. 1.

FIG. 7 schematically illustrates an embodiment of photon source 110 of the integrated circuit chip of FIG. 1.

Photon source 110 comprises a ring oscillator 500. Ring oscillator 500 comprises series-coupled inverters 502, for example, series-connected. As an example, three inverters are shown. The ring oscillator may comprise any odd number, preferably greater than or equal to 3, of inverters in series. The output of each inverter 502 other than the last inverter (502L) in the series is coupled, for example, connected to the input of the next inverter. The output of the last inverter of the series association is coupled to the input of an AND gate 504 having its other input provided to receive an activation signal EN. The output of the AND gate is coupled to the input of the first inverter (502F) in the series. Each inverter typically comprises an N-channel MOS transistor and a P-channel MOS transistor, not shown, series-coupled between nodes of application of a power supply voltage, for example, a node of application of a potential V and a ground GND. The power supply voltage is typically in the range from 1 to 2 V.

In operation, each inverter switches between low and high logic levels, repeatedly at a frequency for example greater than 100 MHz, preferably greater than 1 GHz. At each switching, the MOS transistors of the inverters emit photons, originating from various electron and hole recombination phenomena within the transistors.

A photon source 110 only comprising transistors has thus been obtained. This enables to form photon source 110 at the same time as the integrated circuit chip circuits 104, without requiring an additional manufacturing step.

As a variation, an even number of inverters may be provided in the oscillator, and the AND gate may be replaced with a NAND gate. The photon source may be any other circuit comprising one or a plurality of transistors provided for, in operation, successively blocking and give way to a current, preferably repeatedly.

Figure 8:
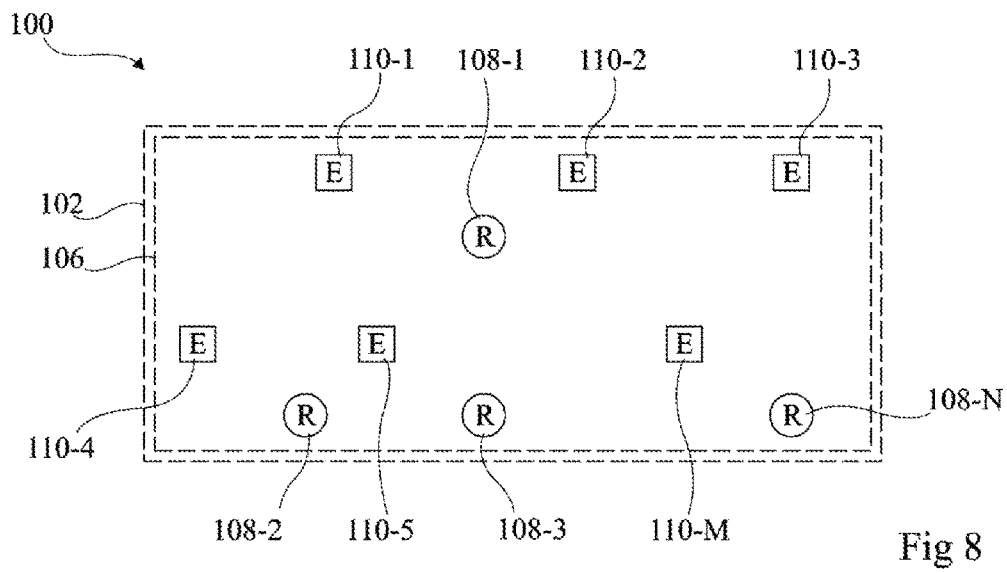
FIG. 8 is a top view partially and schematically illustrating an alternative embodiment of the integrated circuit chip of FIG. 1.

FIG. 8 is a top view partially and schematically illustrating an alternative embodiment of integrated circuit chip 100 of FIG. 1.

The integrated circuit chip comprises a number M of photon sources 110 (110-1 to 110-5, . . . , 110-M) and a number N of photon detectors 108 (108-1 to 108-3, . . . , 108-N). Sources 110 and detectors 108 are distributed among the circuits to be protected. Sources 110 and detectors 108 are coupled to circuit 120, not shown. Shield 106 integrally covers the back side of the substrate portion inside and on top of which sources 110, detectors 108, and the components to be protected of the circuits are formed. Shields 109 covering the detectors are not shown.

Figure 9:
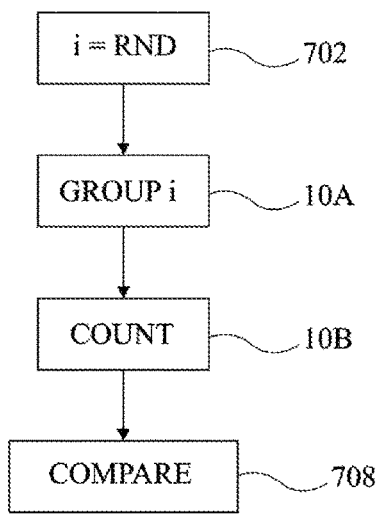
FIG. 9 illustrates steps of an embodiment of an electronic integrated circuit chip protection method.
Figure 10:
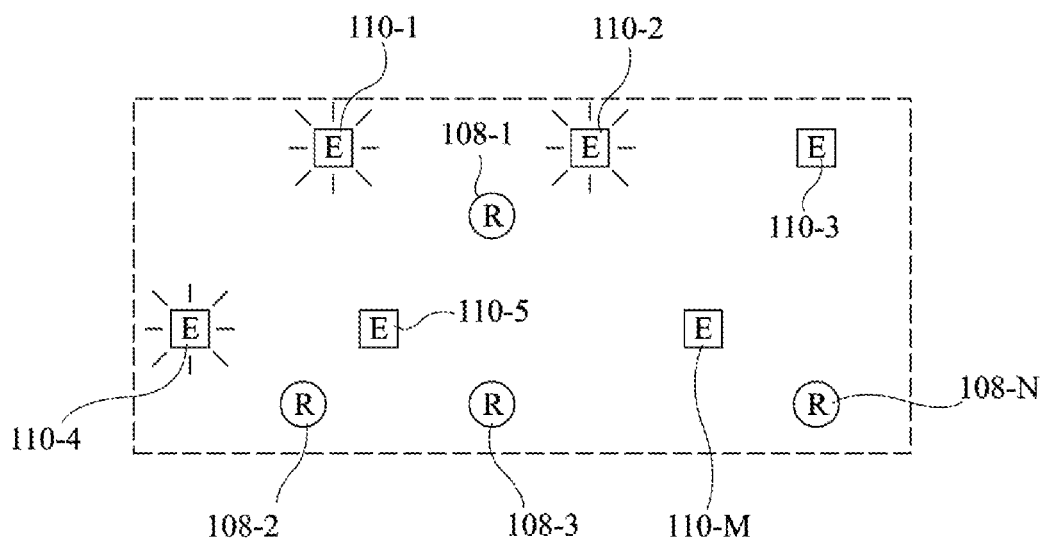
FIG. 10 illustrates two steps 10A and 10B of the method of FIG. 9.
Figure 10:
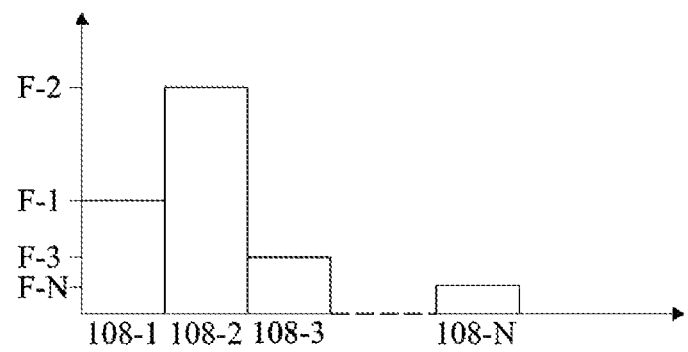

FIGS. 9 and 10 illustrate steps of an embodiment of a method of protecting the integrated circuit chip of FIG. 8.

Before the implementation of the steps of FIG. 9, P groups of photon sources have been predefined, P being an integer. Each group comprises one or a plurality of photon sources 110. Each group has an associated index, for example, having an integer value i in the range from 1 to P.

At a step 702 (i=RND), a value of index i is selected, preferably randomly. The group associated with index i is selected.

At a step 10A (GROUP i), illustrated in FIG. 10, all the photon sources of the selected group are activated. The other photon sources are maintained inactive. In the illustrated example, sources 110_1, 110_2, and 110_4 are activated.

At a step 10B (COUNT), illustrated in FIG. 10, circuit 120 counts the photons detected by each of the detectors and deduces therefrom measured values F_1, . . . , F_N of the frequency of photon arrival on the respective detectors 108-1, . . . , 108-N. Each of values F_1, . . . , F_N depends on the selected group.

At a step 708 (COMPARE), each of the measured values is compared with an expected value. The expected value corresponds to the value measured when shield 106 is intact, and is a function of the selected group. Circuit 102 then emits a signal as soon as a single one of the measured values has, with the expected value, a difference greater than a threshold.

An advantage is that the integrated circuit chip is protected against attacks using one or a plurality of adjustable photon sources. In such attacks, the attacker removes at least a portion of shield 106 and then uses the sources to send photons onto the back side. The attacker adjusts the sources to match the measured values of frequency of photon arrival on detectors 108 with the corresponding expected values. However, due to the protection provided in the described method, not adjustment of the sources enables to carry out the attack. Indeed, the selected group changes for each attack attempt. Further, when the selection of the group is random, no source adjustment sequence enables to carry out the attack.

Various embodiments and variations have been described. It should be clear to those skilled in the art that certain characteristics of these various embodiments and variations may be combined, and other variations will occur to those skilled in the art.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An electronic integrated circuit chip, comprising:
a semiconductor substrate;
a first shield adjacent a first side of the semiconductor substrate;
a second shield adjacent a second side of the semiconductor substrate opposite the first side; and
a first photon detector supported at the first side of the semiconductor substrate and located between the first and second shields.

2. The integrated circuit chip of claim 1, wherein at least one of the first shield and the second shield is metallic.

3. The integrated circuit chip of claim 1, wherein the second side of the semiconductor substrate is a back side covered with the second shield, and the first side of the semiconductor substrate is a front side, and wherein the first photon detector located inside and on top of the front side.

4. The integrated circuit chip of claim 3, wherein the first shield has a full surface located vertically above the first photon detector and extending horizontally in all directions from a position of the first photon detector along at least a first distance greater than a second distance separating said first shield from the front side of the semiconductor substrate.

5. The integrated circuit chip of claim 3, wherein the second shield leaves a portion of the back side of the substrate exposed.

6. The integrated circuit chip of claim 5, further comprising a second photon detector located inside and on top of the semiconductor substrate at a location aligned with said portion.

7. The integrated circuit chip of claim 1, further comprising a photon source configured to emit photons towards a surface of the second shield facing the first detector.

8. The integrated circuit chip of claim 7, wherein the photon source is a ring oscillator circuit.

9. The integrated circuit chip of claim 1, wherein the first photon detector comprises a SPAD.

10. The integrated circuit chip of claim 1, further comprising a circuit configured to measure a value representative of a number of photons detected by the first detector during a time period, detect a difference between the measured value and an expected value, and generate an alert if the difference exceeds a threshold.

11. An electronic integrated circuit chip, comprising:
a semiconductor substrate including a first side and a second side opposite the first side;
a first shield positioned above the first side of the semiconductor substrate;
a second shield positioned adjacent the second side of the semiconductor substrate;
a photon detector supported at the first side of the semiconductor substrate;
a photon source supported at the first side of the semiconductor substrate;
wherein said photon source is configured to emit photons to travel through the semiconductor substrate, reflect off the second shield, further travel through the semiconductor substrate; and reflect off the first shield towards the photon detector.

12. The integrated circuit chip of claim 11, wherein the photon source is a ring oscillator circuit.

13. The integrated circuit chip of claim 11, wherein the first photon detector comprises a SPAD.

14. The integrated circuit chip of claim 11, further comprising a circuit coupled to the photon detector and configured to measure a value representative of a number of photons detected by the detector, determine a difference between the measured value and an expected value, and generate an alert if the difference exceeds a threshold.

15. The integrated circuit chip of claim 11, wherein the second side is a back side of the semiconductor substrate, and the first side is a front side of the semiconductor substrate.

* * * * *